United States Patent
Zhang et al.

(10) Patent No.: US 10,319,285 B2
(45) Date of Patent: Jun. 11, 2019

(54) PANEL DRIVE DEVICE AND DISPLAY DEVICE

(71) Applicants: BOE TECHNOLOGY GROUP CO., LTD, Beijing (CN); HEFEI XINSHENG OPTOELECTRONICS TECHNOLOGY CO., LTD., Hefei, Anhui (CN)

(72) Inventors: Yanping Zhang, Beijing (CN); Tao Ma, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei, Anhui (CN)

( * ) Notice: Subject to any disclaimer, the term of this patent is extended or adjusted under 35 U.S.C. 154(b) by 0 days.

(21) Appl. No.: 15/566,035

(22) PCT Filed: Apr. 25, 2017

(86) PCT No.: PCT/CN2017/081872
§ 371 (c)(1),
(2) Date: Oct. 12, 2017

(87) PCT Pub. No.: WO2017/206630
PCT Pub. Date: Dec. 7, 2017

(65) Prior Publication Data
US 2019/0080642 A1    Mar. 14, 2019

(30) Foreign Application Priority Data
Jun. 3, 2016 (CN) .......................... 2016 1 0389582

(51) Int. Cl.
*G09G 3/20* (2006.01)
*G02F 1/133* (2006.01)
*G09G 3/36* (2006.01)

(52) U.S. Cl.
CPC ....... *G09G 3/2096* (2013.01); *G02F 1/13306* (2013.01); *G09G 3/36* (2013.01)

(58) Field of Classification Search
CPC ..... G09G 3/2096; G09G 3/36; G02F 1/13306
See application file for complete search history.

(56) References Cited

U.S. PATENT DOCUMENTS

| | | | | |
|---|---|---|---|---|
| 5,489,910 A | * | 2/1996 | Kuwata | G09G 3/3611 345/212 |
| 6,011,435 A | * | 1/2000 | Takeyabu | H03F 3/45475 330/252 |

(Continued)

FOREIGN PATENT DOCUMENTS

| | | |
|---|---|---|
| CN | 101295080 A | 10/2008 |
| CN | 202394505 U | 8/2012 |

(Continued)

OTHER PUBLICATIONS

PCT International Search Report dated Jul. 20, 2017 for PCT Patent Application No. PCT/CN2017/081872. (13 Pages).

*Primary Examiner* — Dmitriy Bolotin
(74) *Attorney, Agent, or Firm* — McAndrews, Held & Malloy, Ltd.

(57) ABSTRACT

Embodiments of the present disclosure provides a panel drive device and a display device. The panel drive device includes an interface module, a voltage conversion module and a compensation module. The interface module includes a first input end and a first output end. The voltage conversion module includes a second input end and a second output end. The first output end is coupled with the second input end. A voltage at the first input end is a first voltage, a voltage at the first output end is a second voltage, a voltage at the second input end is a third voltage signal and a voltage at the second output end is a fourth voltage signal. The compensation module is configured to generate a compen- (Continued)

sation voltage signal according to the third voltage signal and apply the compensation voltage signal to the first input end or the first output end, so that the third voltage signal equals to the first voltage signal. The panel drive device and the display device according to embodiments of the present disclosure are able to compensate for the losses in the transmission cables as well as in the wires of the printed circuit board, thereby avoiding abnormal operations of the liquid crystal panel.

20 Claims, 3 Drawing Sheets

(56) References Cited

U.S. PATENT DOCUMENTS

| | | | |
|---|---|---|---|
| 7,902,910 B2 * | 3/2011 | Park | H02M 3/07 327/536 |
| 8,704,816 B2 | 4/2014 | Liao et al. | |
| 8,780,021 B2 | 7/2014 | Han | |
| 9,418,597 B2 | 8/2016 | Han | |
| 2008/0266469 A1 | 10/2008 | Chen et al. | |
| 2013/0038638 A1 | 2/2013 | Liao et al. | |
| 2013/0182018 A1 * | 7/2013 | Jeong | G09G 3/3659 345/690 |
| 2014/0320469 A1 | 10/2014 | Han | |
| 2015/0153605 A1 * | 6/2015 | Chang | G02F 1/13306 349/33 |
| 2015/0228238 A1 * | 8/2015 | Lee | G09G 3/3648 345/209 |

FOREIGN PATENT DOCUMENTS

| | | |
|---|---|---|
| CN | 202551076 U | 11/2012 |
| CN | 105468063 A | 4/2016 |
| CN | 105632427 A | 6/2016 |
| CN | 105845096 A | 8/2016 |
| KR | 20080096360 A | 10/2008 |
| KR | 20130055262 A | 5/2013 |
| TW | 200842439 A | 11/2008 |
| WO | 2013082792 A1 | 6/2013 |

* cited by examiner

PANEL DRIVE DEVICE AND DISPLAY DEVICE

CROSS-REFERENCE TO RELATED APPLICATION

This application is a National Phase Entry of PCT International Application No. PCT/CN2017/081872, which was filed on Apr. 25, 2017, and claims priority to Chinese Patent Application No. 201610389582.6, which was filed on Jun. 3, 2016, the content of which is incorporated by reference in the entirety.

TECHNICAL FIELD

The present disclosure relates to the field of display technologies, and particularly to a panel drive device and a display device.

DESCRIPTION OF THE RELATED ART

An existing thin-film-transistor liquid-crystal display (TFT-LCD) device usually includes a panel drive device, which includes an interface module and a voltage conversion module. Particularly, the interface module receives a first voltage from a power module, outputs a second voltage, and then provides the voltage conversion module with the second voltage through wires of a printed circuit board. Due to voltage losses in transmission cables of the interface module, the second voltage output by the interface module is usually lower than the first voltage received by the interface module. Because of voltage losses in the wires of the printed circuit board, the third voltage actually received by the voltage conversion module is usually lower than the second voltage output by the interface module. Correspondingly, the third voltage actually received by the voltage conversion module is usually lower than the first voltage received by the interface module.

In this case, since the third voltage received by the voltage conversion module is relatively low, the voltage conversion module might operate abnormally or the output voltage of the voltage conversion module might be abnormal, causing the TFT-LCD device to operate abnormally. The situation gets worse especially when the load of the panel drive device is heavy.

SUMMARY

An embodiment of the present disclosure provides a panel drive device and a display device, which are able to compensate for the voltage losses in the transmission cables as well as in the wires of the printed circuit board, so that a third voltage signal received at an input end of the voltage conversion module equals to a first voltage signal received at an input end of the interface module, thereby avoiding abnormal operations of the liquid crystal panel.

According to one aspect of the present disclose, a panel drive device is provided, where the panel drive device includes an interface module, a voltage conversion module and a compensation module. The interface module includes a first input end and a first output end. The voltage conversion module includes a second input end and a second output end. The first output end is coupled with the second input end. A voltage signal at the first input end is a first voltage signal, a voltage signal at the first output end is a second voltage signal, a voltage signal at the second input end is a third voltage signal and a voltage signal at the second output end is a fourth voltage signal. The compensation module is configured to generate a compensation voltage signal according to the third voltage signal and apply the compensation voltage signal to the first input end or the first output end, so that a value of the third voltage signal equals to a value of the first voltage signal.

According to an exemplary embodiment, the compensation module includes a first resistor, a differential amplifier circuit and a conversion unit. A first end of the first resistor receives the third voltage signal and a second end of the first resistor is grounded. Two input ends of the differential amplifier circuit are coupled with the two ends of the first resistor respectively, and an output end of the differential amplifier circuit is coupled with the conversion unit.

According to an exemplary embodiment, the compensation module includes a first resistor, a second resistor, a differential amplifier circuit and a conversion unit. A first end of the first resistor receives the third voltage signal and a second end of the first resistor is grounded via the second resistor. Two input ends of the differential amplifier circuit are coupled with the two ends of the first resistor respectively, and an output end of the differential amplifier circuit is coupled with the conversion unit.

According to an exemplary embodiment, the differential amplifier circuit includes a differential amplifier, a third resistor, a fourth resistor, a fifth resistor and a sixth resistor. One end of the third resistor is coupled with the first end of the first resistor, while the other end of the third resistor is coupled with a first input end of the differential amplifier; one end of the fourth resistor is coupled with the second end of the first resistor, while the other end of the fourth resistor is coupled with the a second input end of the differential amplifier; one end of the fifth resistor is grounded, and the other end of the fifth resistor is coupled with the first input end of the differential amplifier; one end of the sixth resistor is coupled with the second input end of the differential amplifier, while the other end of the sixth resistor is coupled with an output end of the differential amplifier.

According to an exemplary embodiment, in the differential amplifier circuit, a ratio of a resistance of the fifth resistor to a resistance of the third resistor equals to a ratio of a resistance of the sixth resistor to a resistance of the fourth resistor.

According to an exemplary embodiment, the conversion unit is configured to multiply a difference value between a reference voltage of an output voltage of the differential amplifier and the output voltage of the differential amplifier by a preset coefficient, to obtain a value of the compensation voltage signal.

According to an exemplary embodiment, the panel drive device further includes a timing controller configured to receive a first control signal from the interface module, receive the fourth voltage signal from the voltage conversion module and output a second control signal.

According to an exemplary embodiment, the panel drive device further includes a gate drive circuit configured to receive the second control signal from the timing controller and output a gate drive signal.

According to an exemplary embodiment, the panel drive device further includes a gamma circuit configured to receive the fourth voltage signal from the voltage conversion module, receive a data signal from the interface module and output a gamma voltage signal.

According to an exemplary embodiment, the panel drive device further includes a source drive circuit configured to receive the fourth voltage signal from the voltage conversion module, receive the gamma voltage signal from the gamma circuit and output a source drive signal.

According to another aspect of the present disclosure, a display device is also provided, which includes a panel drive device according to any one of the abovementioned exemplary embodiments.

BRIEF DESCRIPTION OF THE DRAWINGS

In order to make the technical solutions according to the embodiments of the present disclosure or the prior art more apparent, the accompanying drawings, which are to be used in the description of the embodiments or the prior art, will be briefly described. Obviously, the drawings mentioned below just illustrate some embodiments of the present disclosure, and on the basis of these drawings other drawings can be obtained by those skilled in the art without any inventive effort.

DETAILED DESCRIPTION OF THE EMBODIMENTS

In order to make the objects, technical solutions, and advantages of the embodiments of the disclosure more apparent, the technical solutions according to the embodiments of the present disclosure will now be described clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

In addition, as used herein, the term "a plurality of" is intended to refer to two or more than two unless otherwise indicated, and the terms such as "first" and "second" are only used to distinguish between different components or operations and are not used to limit the components or operations.

Figure 1:
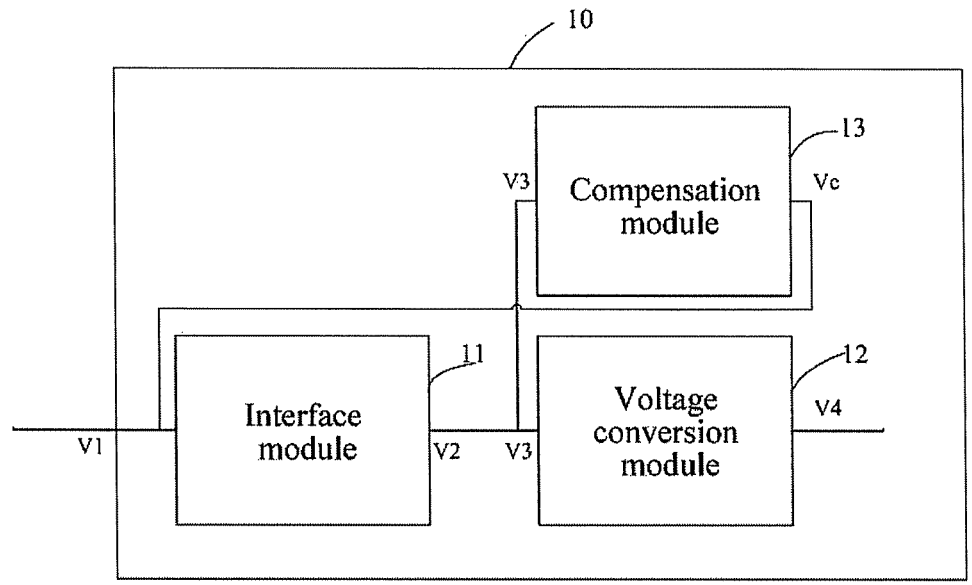
FIG. 1 is a structural block diagram of a panel drive device according to a first embodiment of the present disclosure.

FIG. 1 illustrates a structural block diagram of a panel drive device 10 according to a first embodiment of the present disclosure.

As illustrated in FIG. 1, the panel drive device 10 according to the first embodiment of the present disclosure can include an interface module 11, a voltage conversion module 12 and a compensation module 13.

Particularly, the interface module 11 can receive a first voltage signal V1 from a power module at an input end of the interface module 11, and output a second voltage signal V2 to the voltage conversion module 12 from an output end of the interface module 11. Due to transmission losses of cables in the interface module 11, a value of the second voltage signal V2 is usually lower than a value of the first voltage signal V1.

The voltage conversion module 12 can receive the second voltage signal V2 from the interface module 11 via wires of a printed circuit board. Due to voltage losses in the wires of the printed circuit board, the voltage signal received at the input end of the voltage conversion module 12 is a third voltage signal V3, and a value of the third voltage signal V3 is usually lower than the value of the second voltage signal V2. Correspondingly, the value of the third voltage signal V3 is lower than the value of the first voltage signal V1. The voltage conversion module 12 is configured to convert the third voltage signal V3 into a fourth voltage signal V4 through a boosting circuit or a buck circuit.

The compensation module 13 can generate a compensation voltage signal Vc according to the third voltage signal V3 and output the compensation voltage signal Vc to the input end of the interface module 11, so that the value of the third voltage signal V3 equals to the value of the first voltage signal V1.

In this way, by outputting the compensation voltage signal Vc to the input end of the interface module 11, the panel drive device 10 according to the embodiment of the present disclosure, is able to compensate for losses in the transmission cables and in the wires of the printed circuit board, so that the value of the third voltage signal V3 received by the voltage conversion module 12 equals to the value of the first voltage signal V1, thereby avoiding abnormal operations of the liquid crystal panel.

In order to make the value of the third voltage signal V3 equals to the value of the first voltage signal V1, if the value of the third voltage signal V3 is different from a reference voltage of the third voltage signal V3, the compensation voltage signal Vc should be generated correspondingly to compensate at the input end of the interface module 11.

Figure 2:
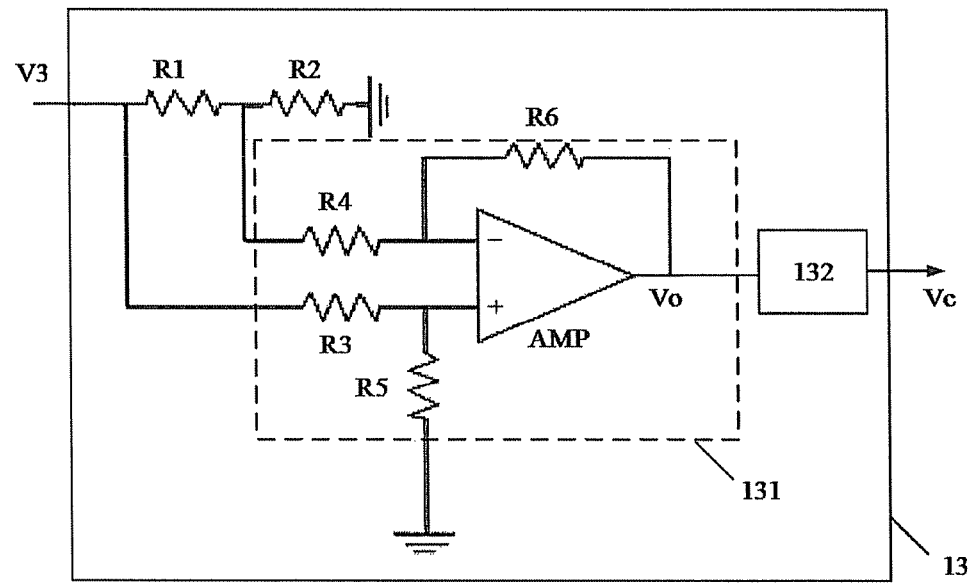
FIG. 2 is a circuit diagram of a compensation module according to an embodiment of the present disclosure.

FIG. 2 illustrates a circuit diagram of a compensation module according to an embodiment of the present disclosure.

As illustrated in FIG. 2, the compensation module 13 can include a first resistor R1, a differential amplifier circuit 131 and a conversion unit 132. A first end of the first resistor R1 receives the third voltage signal V3, a second end of the first resistor R1 is grounded via a second resistor R2. Then a voltage at the second end of the first resistor R1 is V3*R2/(R1+R2), and a voltage difference between the two ends of the first resistor R1, ΔV, equals to V3*R1/(R1+R2). Two input ends of the differential amplifier circuit 131 are coupled with the two ends of the first resistor R1 respectively. An output end of the differential amplifier circuit 131 is coupled with the conversion unit 132, and outputs an output voltage Vo based on the voltage difference between the two ends of the first resistor R1, i.e. the output voltage Vo is a multiple of V3*R1/(R1+R2).

As illustrated in FIG. 2, the differential amplifier circuit 131 includes a differential amplifier AMP, a third resistor R3, a fourth resistor R4, a fifth resistor R5 and a sixth resistor R6. One end of the third resistor R3 is coupled with the first end of the first resistor R1, and the other end of the third resistor R3 is coupled with a first input end of the differential amplifier AMP. One end of the fourth resistor R4 is coupled with the second end of the first resistor R1, and the other end of the fourth resistor R4 is coupled with a second input end of the differential amplifier AMP. One end of the fifth resistor R5 is grounded, and the other end of the fifth resistor R5 is coupled with the first input end of the differential amplifier AMP. One end of the sixth resistor R6 is coupled with the second input end of the differential amplifier AMP, and the other end of the sixth resistor R6 is coupled with an output end of the differential amplifier AMP.

As illustrated in FIG. 2, the first input end of the differential amplifier AMP is a non-inverting input end (+) of the differential amplifier AMP and the second input end of the differential amplifier AMP is an inverting input end (−) of the differential amplifier AMP. It should be noted that, according to exemplary embodiments of the present disclosure, the first input end of the differential amplifier AMP can also be the inverting input end (−) of the differential amplifier AMP, while the second input end of the differential amplifier AMP can also be the non-inverting input end (+) of the differential amplifier AMP.

As illustrated in FIG. 2, in order to simplify the calculation of the output voltage of the differential amplifier AMP, it is supposed that a ratio of a resistance of the fifth resistor R5 to a resistance of the third resistor R3 equals to a ratio of a resistance of the sixth resistor R6 to a resistance of the fourth resistor R4, and then the output voltage Vo of the differential amplifier AMP is:

$$Vo = \frac{R6}{R4} \times \Delta V = \frac{R6}{R4} \times V3 \times \frac{R1}{R1+R2}. \quad (1)$$

Suppose that the value of the first voltage signal V1 received at the input end of the interface module 11 is 3.3 V, the value of the second voltage signal V2 output at the output end of the interface module 11 is 3.2 V, the value of the third voltage signal V3 received at the input end of the voltage conversion module 12 is 3.1 V, R1=R2, and R6=6*R4, then the output voltage Vo of the differential amplifier is two times greater than the value of the third voltage signal V3 according to the formula (1). Then, the reference voltage of the third voltage signal V3 is set as 3.3 V, and a reference voltage of the output voltage Vo of the differential amplifier is 9.9 V, whereas the actual output voltage of the differential amplifier is 3*3.1V, i.e. the actual output voltage of the differential amplifier is 9.3 V.

Then a value of the compensation voltage signal Vc can be set by the conversion unit 132 to be a product of a preset first coefficient k1 and a difference value between the reference voltage of the output voltage of the differential amplifier and the output voltage Vo of the differential amplifier, i.e., the value of the compensation voltage signal Vc can be set to be k1*(9.9−9.3) V=k1*0.6V, where the first coefficient k1 can be obtained through a priori method. For example, the first coefficient k1 can be set as ⅓, and then the value of the compensation voltage signal is 0.2 V.

By outputting the compensation voltage signal Vc to the input end of the interface module 11, the sum of the compensation voltage signal Vc and the first voltage signal V1 can be applied to the input end of the interface module 11, so that the voltage at the input end of the interface module 11 is 3.5V. In this way, according to the abovementioned attenuation rule, the value of the second voltage signal V2 at the output end of the interface module 11 is 3.4 V, and the value of the third voltage signal V3 at the input end of the voltage conversion module 12 is 3.3V, equivalent to the value of the first voltage signal V1.

Figure 3:
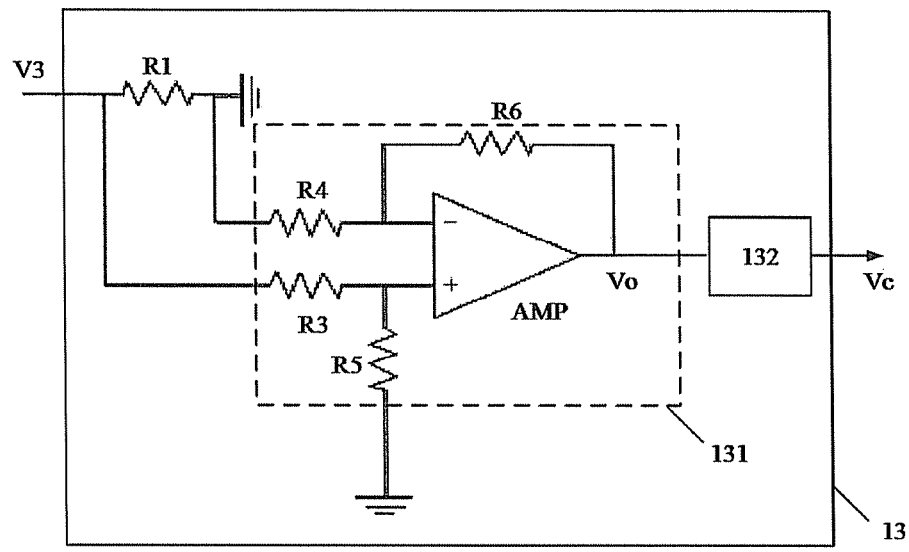
FIG. 3 is a circuit diagram of a compensation module according to another embodiment of the present disclosure.

FIG. 3 illustrates a circuit diagram of a compensation module according to another embodiment of the present disclosure.

Different from FIG. 2, the second end of the first resistor R1 in FIG. 3 is grounded directly. Then the embodiment of the compensation module 13 illustrated by FIG. 3 can be considered as a special case of the compensation module 13 illustrated by FIG. 2 when the resistance of the second resistor is 0. Then the voltage difference between the two ends of the first resistor R1, ΔV, equals to V3.

As illustrated in FIG. 3, in order to simplify the calculation of the output voltage of the differential amplifier AMP, it is supposed that a ratio of the resistance of the fifth resistor R5 to the resistance of the third resistor R3 equals to a ratio of the resistance of the sixth resistor R6 to the resistance of the fourth resistor R4, and then the output voltage Vo of the differential amplifier is:

$$Vo = \frac{R6}{R4} \times \Delta V = \frac{R6}{R4} \times V3. \quad (2)$$

Suppose that the value of the first voltage signal V1 received at the input end of the interface module 11 is 3.3 V, the value of the second voltage signal V2 output at the output end of the interface module 11 is 3.2 V, the value of the third voltage signal V3 received at the input end of the voltage conversion module 12 is 3.1 V, and R6=6*R4, then the output voltage Vo of the differential amplifier is five times greater than the value of the third voltage signal V3 according to the formula (2). Then, the reference voltage of the third voltage signal V3 is set as 3.3 V, and the reference voltage of the output voltage Vo of the differential amplifier is 6*3.3V=19.8V, whereas the actual output voltage of the differential amplifier is 6*3.1V, i.e. the actual output voltage of the differential amplifier is 18.6V.

Then the value of the compensation voltage signal Vc can be set by the conversion unit 132 to be a product of a preset second coefficient k2 and the difference value between the reference voltage of the output voltage of the differential amplifier and the output voltage Vo of the differential amplifier, i.e., the value of the compensation voltage signal Vc can be set to be k2*(19.8−18.6) V=k2*1.2V, where the second coefficient k2 can be obtained through a priori method. For example, the second coefficient k2 can be set as ⅙, and then the value of the compensation voltage signal Vc is 0.2 V.

By outputting the compensation voltage signal Vc to the input end of the interface module 11, the sum of the compensation voltage signal Vc and the first voltage signal V1 can be applied to the input end of the interface module 11, so that the voltage at the input end of the interface module 11 is 3.5V. In this way, according to the abovementioned attenuation rule, the value of the second voltage signal V2 at the output end of the interface module 11 is 3.4 V, and the value of the third voltage signal V3 at the input end of the voltage conversion module 12 is 3.3V, equivalent to the value of the first voltage signal V1.

Figure 4:
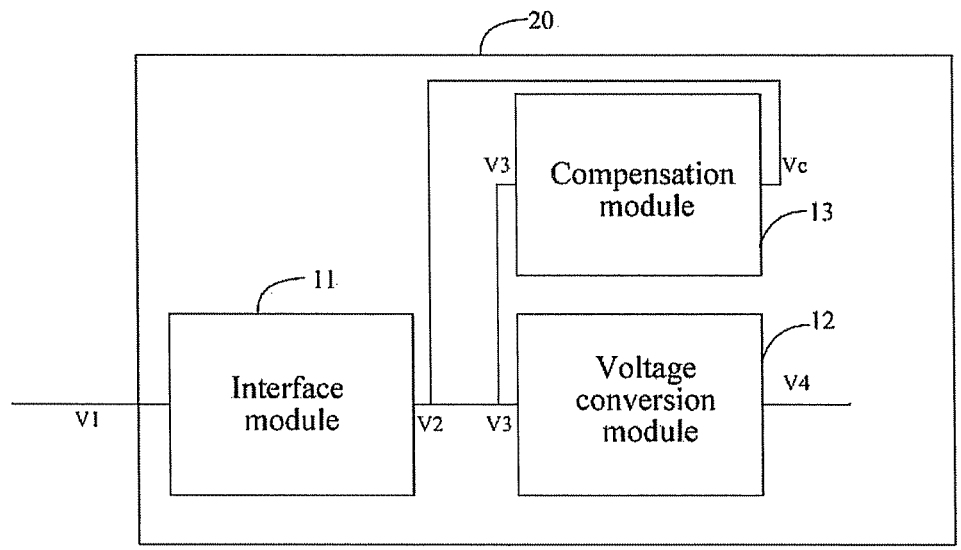
FIG. 4 is a structural block diagram of a panel drive device according to a second embodiment of the present disclosure.

FIG. 4 illustrates a structural block diagram of a panel drive device according to a second embodiment of the present disclosure.

As illustrated in FIG. 4, the panel drive device according to the second embodiment of the present disclosure includes an interface module 11, a voltage conversion module 12 and a compensation module 13.

Different from FIG. 1, in FIG. 4, the compensation voltage signal Vc generated by the compensation module 13 is applied to the output end of the interface module 11, so that the value of the third voltage signal V3 equals to the value of the first voltage signal V1.

In this way, by applying the compensation voltage signal Vc to the output end of the interface module 11, the panel drive device 10 according to the embodiment of the present disclosure, is able to compensate for losses in the transmission cables and in the wires of the printed circuit board, so that the value of the third voltage signal V3 received by the voltage conversion module 12 equals to the value of the first voltage signal V1, thereby avoiding abnormal operations of the liquid crystal panel.

The methods for generating the compensation voltage signal Vc by the compensation module 13 has been described above, and thus will not be repeated again.

When the compensation module 13 illustrated in FIG. 2 is applied to the panel drive device 20 illustrated in FIG. 4, suppose that the value of the first voltage signal V1 received at the input end of the interface module 11 is 3.3 V, the value of the second voltage signal V2 output at the output end of the interface module 11 is 3.2 V, the value of the third voltage signal V3 received at the input end of the voltage conversion module 12 is 3.1 V, R1=R2, and R6=6*R4, then the output voltage Vo of the differential amplifier is two times greater than the value of the third voltage V3 according to the formula (1). Then, the reference voltage of the third voltage signal V3 is set as 3.3 V, and the reference voltage of the output voltage Vo of the differential amplifier is 9.9 V, whereas the actual output voltage of the differential amplifier is 3*3.1V, i.e. the actual output voltage of the differential amplifier is 9.3 V.

Then a value of the compensation voltage signal Vc can be set by the conversion unit 132 to be a product of a preset third coefficient k3 and a difference value between the reference voltage of the output voltage of the differential amplifier and the output voltage Vo of the differential amplifier, i.e., the value of the compensation voltage signal Vc can be set to be k3*(9.9−9.3) V=k3*0.6V, where the third coefficient k3 can be obtained through a priori method. For example, the third coefficient k3 can be set as ⅓, and then the value of the compensation voltage signal Vc is 0.2 V.

By applying the compensation voltage signal Vc to the output end of the interface module 11, the sum of the compensation voltage signal Vc and the second voltage signal V2 can be applied to the output end of the interface module 11, so that the voltage at the output end of the interface module 11 is 3.4V. In this way, according to the abovementioned attenuation rule, the value of the third voltage signal V3 at the input end of the voltage conversion module 12 is 3.3V, equivalent to the value of the first voltage signal V1.

When the compensation module 13 illustrated in FIG. 3 is applied to the panel drive device 20 illustrated in FIG. 4, suppose that the value of the first voltage signal V1 received at the input end of the interface module 11 is 3.3 V, the value of the second voltage signal V2 output at the output end of the interface module 11 is 3.2 V, the value of the third voltage signal V3 received at the input end of the voltage conversion module 12 is 3.1 V, and R6=6*R4, then the output voltage Vo of the differential amplifier is five times greater than the value of the third voltage signal V3 according to the formula (2). Then, the reference voltage of the third voltage signal V3 is set as 3.3 V, and the reference voltage of the output voltage Vo of the differential amplifier is 19.8 V, whereas the actual output voltage of the differential amplifier is 6*3.1V, i.e. the actual output voltage of the differential amplifier is 18.6 V.

Then a value of the compensation voltage signal Vc can be set by the conversion unit 132 to be a product of a preset fourth coefficient k4 and a difference value between the reference voltage of the output voltage of the differential amplifier and the output voltage Vo of the differential amplifier, i.e., the value of the compensation voltage signal Vc can be set to be k4*(19.8−18.6) V=k4*1.2V, where the fourth coefficient k4 can be obtained through a priori method. For example, the fourth coefficient k4 can be set as ⅙, and then the value of the compensation voltage signal Vc is 0.2 V.

By applying the compensation voltage signal Vc to the output end of the interface module 11, the sum of the compensation voltage signal Vc and the second voltage signal V2 can be applied to the output end of the interface module 11, so that the voltage at the output end of the interface module 11 is 3.4V. In this way, according to the abovementioned attenuation rule, the value of the third voltage signal V3 at the input end of the voltage conversion module 12 is 3.3V, equivalent to the value of the first voltage signal V1.

Figure 5:
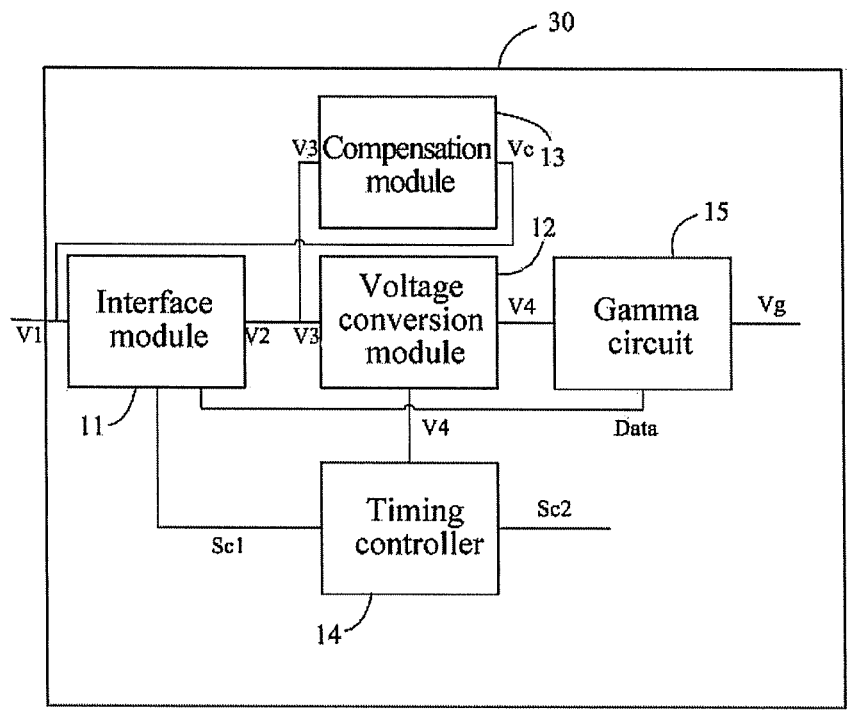
FIG. 5 is a structural block diagram of a panel drive device according to a third embodiment of the present disclosure.

FIG. 5 illustrates a structural block diagram of a panel drive device according to a third embodiment of the present disclosure.

Different from FIG. 1, in FIG. 5, the panel drive device 30 can further include a timing controller 14 and a gamma circuit 15.

Particularly, the timing controller 14 can receive a first control signal Sc1 from the interface module 11, receive a fourth voltage signal V4 from the voltage conversion module 12 and output a second control signal Sc2. The timing controller 14 according to the embodiments of the present disclosure is the same as a timing controller in the prior art, and thus will not be described in detail herein.

Particularly, the gamma circuit 15 can receive a fourth voltage signal V4 from the voltage conversion module 12, receive a data signal Data from the interface module 11 and output a gamma voltage signal Vg. The gamma circuit 15 according to the embodiments of the disclosure is the same as a gamma circuit in the prior art and thus will not be described in detail herein.

Figure 6:
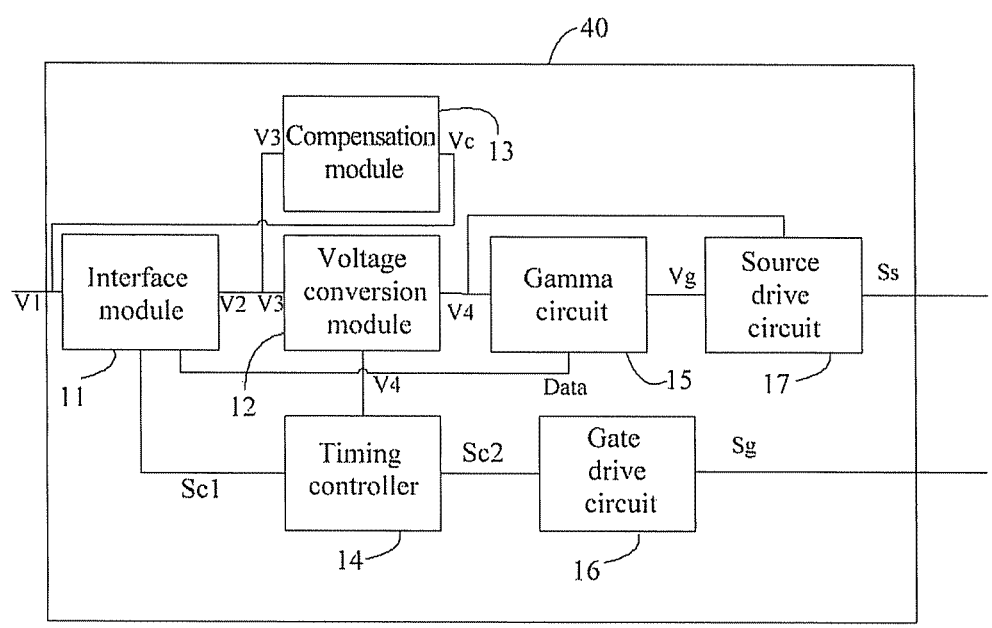
FIG. 6 is a structural block diagram of a panel drive device according to a fourth embodiment of the present disclosure.

FIG. 6 illustrates a structural block diagram of a panel drive device according to a fourth embodiment of the present disclosure.

Different from FIG. 5, the panel drive device 40 can further include a gate drive circuit 16 and a source drive circuit 17.

Particularly, the gate drive circuit 16 can receive a second control signal Sc2 from the timing controller 14, and output a gate drive signal Sg to a liquid crystal panel. The gate drive circuit 16 according to the embodiments of the present disclosure is the same as a gate drive circuit in the prior art, and thus will not be described in detail herein.

Particularly, the source drive circuit 17 can receive the fourth voltage signal V4 from the voltage conversion module 12, receive the gamma voltage signal Vg from the gamma circuit 15, and output a source drive signal Ss to the liquid crystal panel. The source drive circuit 17 according to the embodiments of the present disclosure is the same as a source drive circuit in the prior art, and thus will not be described in detail herein.

Based on the same inventive conception, exemplary embodiments of the present embodiments further provide a display device, which includes a panel drive device according to any one of the abovementioned embodiments.

By applying the compensation voltage signal Vc to the input end or the output end of the interface module 11, the display device according to embodiments of the present disclosure, is able to compensate for losses in the transmission cables and in the wires of the printed circuit board, so that the value of the third voltage signal V3 at the input end of the voltage conversion module 12 equals to the value of the first voltage signal V1 at the input end of the interface module 11, thereby avoiding abnormal operations of the liquid crystal panel.

It should be noted that the display device according to the embodiments of the disclosure can be any product or component with a display function, such as a display panel, electronic paper, a mobile phone, a tablet, a television, a laptop, a digital photo frame or a navigator.

Described above are only some of the embodiments of the present disclosure, to which the scope of the present disclosure is not limited, any change or replacement that can be thought of easily by those skilled in the art within the technical scope disclosed by the present disclosure should fall into the scope of the present disclosure. Therefore, the scope of the present disclosure is defined by the scope claimed by the claims.

The invention claimed is:

1. A panel drive device, comprising an interface module, a voltage conversion module and a compensation module, wherein:
the interface module comprises a first input end and a first output end, the voltage conversion module comprises a second input end and a second output end, and the first output end is coupled with the second input end;
a voltage signal at the first input end is a first voltage signal, a voltage signal at the first output end is a second voltage signal, a voltage signal at the second input end is a third voltage signal and a voltage signal at the second output end is a fourth voltage signal; and
the compensation module is configured to generate a compensation voltage signal according to the third voltage signal and apply the compensation voltage signal to the first input end or the first output end, so that a value of the third voltage signal equals to a value of the first voltage signal.

2. The panel drive device according to claim 1, wherein the compensation module comprises a first resistor, a differential amplifier circuit and a conversion unit, wherein a first end of the first resistor receives the third voltage signal, a second end of the first resistor is grounded, two input ends of the differential amplifier circuit are coupled with two ends of the first resistor respectively, and an output end of the differential amplifier circuit is coupled with the conversion unit.

3. The panel drive device according to claim 2, wherein the differential amplifier circuit comprises a differential amplifier, a third resistor, a fourth resistor, a fifth resistor and a sixth resistor, wherein one end of the third resistor is coupled with the first end of the first resistor, and the other end of the third resistor is coupled with a first input end of the differential amplifier; one end of the fourth resistor is coupled with the second end of the first resistor, and the other end of the fourth resistor is coupled with the a second input end of the differential amplifier; one end of the fifth resistor is grounded, and the other end of the fifth resistor is coupled with the first input end of the differential amplifier; one end of the sixth resistor is coupled with the second input end of the differential amplifier, and the other end of the sixth resistor is coupled with an output end of the differential amplifier.

4. The panel drive device according to claim 3, wherein in the differential amplifier circuit, a ratio of a resistance of the fifth resistor to a resistance of the third resistor equals to a ratio of a resistance of the sixth resistor to a resistance of the fourth resistor.

5. The panel drive device according to claim 2, wherein the conversion unit is configured to multiply a difference value between a reference voltage of an output voltage of the differential amplifier and the output voltage of the differential amplifier by a preset coefficient, to obtain a value of the compensation voltage signal.

6. The panel drive device according to claim 1, wherein the compensation module comprises a first resistor, a second resistor, a differential amplifier circuit and a conversion unit, wherein a first end of the first resistor receives the third voltage signal and a second end of the first resistor is grounded via the second resistor, two input ends of the differential amplifier circuit are coupled with two ends of the first resistor respectively, and an output end of the differential amplifier circuit is coupled with the conversion unit.

7. The panel drive device according to claim 1, wherein the panel drive device further comprises a timing controller configured to receive a first control signal from the interface module, receive the fourth voltage signal from the voltage conversion module and output a second control signal.

8. The panel drive device according to claim 7, wherein the panel drive device further comprises a gate drive circuit configured to receive the second control signal from the timing controller and output a gate drive signal.

9. The panel drive device according to claim 1, wherein the panel drive device further comprises a gamma circuit configured to receive the fourth voltage signal from the voltage conversion module, receive a data signal from the interface module and output a gamma voltage signal.

10. The panel drive device according to claim 9, wherein the panel drive device further comprises a source drive circuit configured to receive the fourth voltage signal from the voltage conversion module, receive the gamma voltage signal from the gamma circuit and output a source drive signal.

11. A display device, comprising a panel drive device, wherein the panel drive device comprising an interface module, a voltage conversion module and a compensation module, wherein:
the interface module comprises a first input end and a first output end, the voltage conversion module comprises a second input end and a second output end, and the first output end is coupled with the second input end;
a voltage signal at the first input end is a first voltage signal, a voltage signal at the first output end is a second voltage signal, a voltage signal at the second input end is a third voltage signal and a voltage signal at the second output end is a fourth voltage signal; and
the compensation module is configured to generate a compensation voltage signal according to the third voltage signal and apply the compensation voltage signal to the first input end or the first output end, so that a value of the third voltage signal equals to a value of the first voltage signal.

12. The display device according to claim 11, wherein the compensation module comprises a first resistor, a differential amplifier circuit and a conversion unit, wherein a first end of the first resistor receives the third voltage signal, a second end of the first resistor is grounded, two input ends of the differential amplifier circuit are coupled with two ends of the first resistor respectively, and an output end of the differential amplifier circuit is coupled with the conversion unit.

13. The display device according to claim 12, wherein the differential amplifier circuit comprises a differential amplifier, a third resistor, a fourth resistor, a fifth resistor and a sixth resistor, wherein one end of the third resistor is coupled with the first end of the first resistor, and the other end of the third resistor is coupled with a first input end of the differential amplifier; one end of the fourth resistor is coupled with the second end of the first resistor, and the other end of the fourth resistor is coupled with the a second input end of the differential amplifier; one end of the fifth resistor is grounded, and the other end of the fifth resistor is coupled with the first input end of the differential amplifier; one end of the sixth resistor is coupled with the second input end of the differential amplifier, and the other end of the sixth resistor is coupled with an output end of the differential amplifier.

14. The display device according to claim 13, wherein in the differential amplifier circuit, a ratio of a resistance of the fifth resistor to a resistance of the third resistor equals to a ratio of a resistance of the sixth resistor to a resistance of the fourth resistor.

15. The display device according to claim 12, wherein the conversion unit is configured to multiply a difference value between a reference voltage of an output voltage of the differential amplifier and the output voltage of the differential amplifier by a preset coefficient, to obtain a value of the compensation voltage signal.

16. The display device according to claim 11, wherein the compensation module comprises a first resistor, a second resistor, a differential amplifier circuit and a conversion unit, wherein a first end of the first resistor receives the third voltage signal and a second end of the first resistor is grounded via the second resistor, two input ends of the differential amplifier circuit are coupled with two ends of the first resistor respectively, and an output end of the differential amplifier circuit is coupled with the conversion unit.

17. The display device according to claim 11, wherein the panel drive device further comprises a timing controller configured to receive a first control signal from the interface module, receive the fourth voltage signal from the voltage conversion module and output a second control signal.

18. The display device according to claim 17, wherein the panel drive device further comprises a gate drive circuit configured to receive the second control signal from the timing controller and output a gate drive signal.

19. The display device according to claim 11, wherein the panel drive device further comprises a gamma circuit configured to receive the fourth voltage signal from the voltage conversion module, receive a data signal from the interface module and output a gamma voltage signal.

20. The display device according to claim 19, wherein the panel drive device further comprises a source drive circuit configured to receive the fourth voltage signal from the voltage conversion module, receive the gamma voltage signal from the gamma circuit and output a source drive signal.

* * * * *